(12) United States Patent
He

(10) Patent No.: US 10,099,962 B2
(45) Date of Patent: Oct. 16, 2018

(54) SINTERING-FREE INORGANIC CERAMIC BRICK-PLATE AND ITS PREPARATION METHOD

(71) Applicant: Xinqiao He, Guangdong (CN)

(72) Inventor: Xinqiao He, Guangdong (CN)

( * ) Notice: Subject to any disclaimer, the term of this patent is extended or adjusted under 35 U.S.C. 154(b) by 0 days.

(21) Appl. No.: 15/633,758

(22) Filed: Jun. 27, 2017

(65) Prior Publication Data

US 2017/0291854 A1  Oct. 12, 2017

(30) Foreign Application Priority Data

Jun. 12, 2017 (CN) .......................... 2017 1 0437155

(51) Int. Cl.
| | |
|---|---|
| *C04B 35/043* | (2006.01) |
| *C04B 35/626* | (2006.01) |
| *C04B 35/053* | (2006.01) |
| *B28B 3/12* | (2006.01) |
| *B28B 11/24* | (2006.01) |
| *B28B 17/02* | (2006.01) |
| *C04B 35/622* | (2006.01) |

(52) U.S. Cl.
CPC .............. *C04B 35/053* (2013.01); *B28B 3/12* (2013.01); *B28B 11/243* (2013.01); *B28B 17/02* (2013.01); *C04B 35/043* (2013.01); *C04B 35/6264* (2013.01); *C04B 35/62204* (2013.01); *C04B 35/62635* (2013.01); *C04B 2235/3206* (2013.01); *C04B 2235/3418* (2013.01); *C04B 2235/422* (2013.01); *C04B 2235/444* (2013.01); *C04B 2235/5427* (2013.01); *C04B 2235/5454* (2013.01); *C04B 2235/602* (2013.01); *C04B 2235/606* (2013.01); *C04B 2235/656* (2013.01)

(58) Field of Classification Search
CPC ....... C04B 35/53; C04B 35/04; C04B 35/043; C04B 35/0435
See application file for complete search history.

(56) References Cited

U.S. PATENT DOCUMENTS

| | | | | |
|---|---|---|---|---|
| 7,306,642 | B2 * | 12/2007 | Hayward | ........... B01D 39/2068 210/490 |
| 8,026,191 | B2 * | 9/2011 | Heo | ........................ C04B 26/24 501/101 |

FOREIGN PATENT DOCUMENTS

| | | | | | |
|---|---|---|---|---|---|
| JP | | 52033906 A | * | 3/1977 | |
| JP | | 59141353 A | * | 8/1984 | ............. B22D 11/10 |

* cited by examiner

*Primary Examiner* — Karl E Group

(57) ABSTRACT

A sintering-free inorganic ceramic brick-plate and its preparation method are disclosed. The sintering-free inorganic ceramic brick-plate includes following components by mass parts: 25-40 parts of magnesium oxide; 20-35 parts of magnesium chloride; 20-30 parts of fumed silica; 10-20 parts straw powders; 0.1-0.3 parts of graphene powders with a particle size of 2000 meshes; and 0.2-0.4 parts of airgel powders with a particle size of 100 nm. Compared with the prior art, the present invention utilizes a variety of raw natural non-toxic natural mineral raw materials, namely, the graphene powders with the particle size of 2000 meshes and the airgel powders with the particle size of 100 nm for mixing, and then the mixed raw materials can be solidified at room temperature and form sheets, and then the surface of the sheets is processed through printing or spraying glaze, so as to achieve the effect of high-grade tiles and natural marble.

2 Claims, 9 Drawing Sheets

SINTERING-FREE INORGANIC CERAMIC BRICK-PLATE AND ITS PREPARATION METHOD

CROSS REFERENCE OF RELATED APPLICATION

The present invention claims priority under 35 U.S.C. 119(a-d) to CN 201710437155.5, filed Jun. 12, 2017.

BACKGROUND OF THE PRESENT INVENTION

Field of Invention

The present invention relates to the technical field of ceramic materials, and more particularly to a sintering-free inorganic ceramic brick-plate and its preparation method.

Description of Related Arts

Currently, the ceramic has high strength, beautiful outlook and good wear and weather resistance after high temperature sintering and surface printing and spraying glaze treatment, it is one of the best building decoration materials, and there are trillions of market demands for the ceramic every year. However, the traditional ceramic production is an industry which has not only high energy consumption, high emission and high pollution, but also is labor-intensive and is prone to safety accidents. Due to the particularity of the process, the traditional ceramic production must be a twenty-four hours continuous production, the kiln is often repaired, causing overcapacity. In order to market and export, the competition of all enterprises is vicious at the expense of energy resources, resources and environmental pollutions. Therefore, these phenomena need to be improved.

SUMMARY OF THE PRESENT INVENTION

In view of deficiencies of the above technologies, the present invention provides a sintering-free inorganic ceramic brick-plate, which has high strength and is able to save resources and reduce heat emissions, and its preparation method.

To achieve the above object, the present invention provides a sintering-free inorganic ceramic brick-plate, comprising following components by mass parts of:

| | |
|---|---|
| magnesium oxide | 25-40 parts; |
| magnesium chloride | 20-35 parts; |
| Fumed silica | 20-30 parts; |
| straw powders | 10-20 parts; |
| graphene powders with a particle size of 2000 meshes | 0.1-0.3 parts; and |
| airgel powders with a particle size of 100 nm | 0.2-0.4 parts. |

Preferably, the sintering-free inorganic ceramic brick-plate comprises following components by mass parts: 32 parts of magnesium oxide, 28 parts of magnesium chloride, 25 parts of fumed silica, 14.5 parts of straw powders, 0.2 parts of graphene powders with the particle size of 2000 meshes, and 0.3 parts of airgel powders with the particle size of 100 nm.

Also, the present invention provides a preparation method of a sintering-free inorganic ceramic brick-plate, which comprises steps of:

(S1) stirring after placing magnesium chloride and water in a blending tank, completely dissolving the magnesium chloride, obtaining a mixed solution, and then pumping the mixed solution through a first water pump into a first sealing iron can;

(S2) pumping magnesium oxide into a second sealing iron can through a second water pump;

(S3) evenly stirring graphene powders with a particle size of 2000 meshes, airgel powders with a particle size of 100 nm and straw powders, obtaining a mixture, and then pumping the mixture through a third water pump into a third sealing iron can;

(S4) simultaneously opening a safety valve at a bottom of the first sealing iron can, a safety valve at a bottom of the second sealing iron can and a safety valve at a bottom of the third sealing iron can, simultaneously sending the mixed solution in the step (S1), the magnesium oxide in the step (S2) and the mixture in the step (S3) into a high-speed stirring tank, and then evenly mixing and stirring;

(S5) after being evenly mixed and stirred, the mixed solution, the magnesium oxide, and the mixture automatically flowing into a rolling machine, and forming a sheet; and (S6) sending the formed sheet into a high frequency drying tunnel furnace, and then rapidly drying the sheet after increasing a temperature of the high frequency drying tunnel furnace to 1100-1300° C., and finally obtaining the sintering-free inorganic ceramic brick-plate.

Preferably, all of the first sealing iron can in the step (S1), the second sealing iron can in the step (S2) and the third sealing iron can in the step (S3) are placed more than 10 meters above ground.

Preferably, in the step (S1), a mass ratio of the magnesium chloride and the water is 1:50, and a stirring time is 40 min.

Preferably, in the step (S3), a mass ratio of the graphene powders with the particle size of 2000 meshes, the airgel powders with the particle size of 100 nm and the straw powders is 2:3:145.

Preferably, in the step (S4), an automatic measuring device is installed within the high-speed stirring tank; a stirring speed of the high-speed stirring tank is 3000 r/min; after being evenly mixed and stirred through the automatic measuring device, the mixed solution, the magnesium oxide and the mixture automatically flow into the rolling machine and form the sheet.

Preferably, a first retractable bracket with non-alkali glass fiber cloth and a first automatic cutting machine with non-alkali glass fiber cloth are installed at an upper surface of the rolling machine, a second retractable bracket with non-alkali glass fiber cloth and a second automatic cutting machine with non-alkali glass fiber cloth are installed at a lower surface of the rolling machine; an upper surface of the formed sheet is coated with a first layer of non-alkali glass fiber cloth through the first retractable bracket cooperating with the first automatic cutting machine, a lower surface of the formed sheet is coated with a second layer of non-alkali glass fiber cloth through the second retractable bracket cooperating with the second automatic cutting machine.

Preferably, after the upper surface and the lower surface of the formed sheet are respectively coated with the first and second layer of non-alkali glass fiber cloth, the formed sheet is placed in an automatic printing or spraying glaze machine, different patterns are printed on the sheet, and then the sheet is sent into the high frequency drying tunnel furnace and dried after increasing the temperature of the high frequency drying tunnel furnace.

Preferably, a thickness of the sintering-free inorganic ceramic brick-plate prepared through the above method is 2-30 mm, a length thereof is 5-10 m, and a thickness thereof is 60-2000 mm.

Beneficial effects of the present invention are as follows.

Compared with the prior art, the present invention makes full use of a variety of raw natural non-toxic natural mineral raw materials, namely, the graphene powders with the particle size of 2000 meshes and the airgel powders with the particle size of 100 nm for mixing, and then the mixed raw materials can be solidified at room temperature and form sheets, and then the surface of the sheets is processed through printing or spraying glaze treatment, so as to achieve the effect of high-grade tiles and natural marble. The present invention also has the characteristics of heat insulation, light weight, high strength, good toughness and no fragility. All of the raw materials of the present invention are recyclable and reusable, which makes a great contribution to improving the environment, reducing heat emissions and sulfur emissions, and saving resources. The sintering-free inorganic ceramic brick-plate provided by the present invention has far-reaching significance and great value.

These and other objectives, features, and advantages of the present invention will become apparent from the following detailed description, the accompanying drawings, and the appended claims.

DETAILED DESCRIPTION OF THE PREFERRED EMBODIMENT

To more clearly explain the present invention, the present invention is further described with accompanying drawings as follows.

Figure 1:
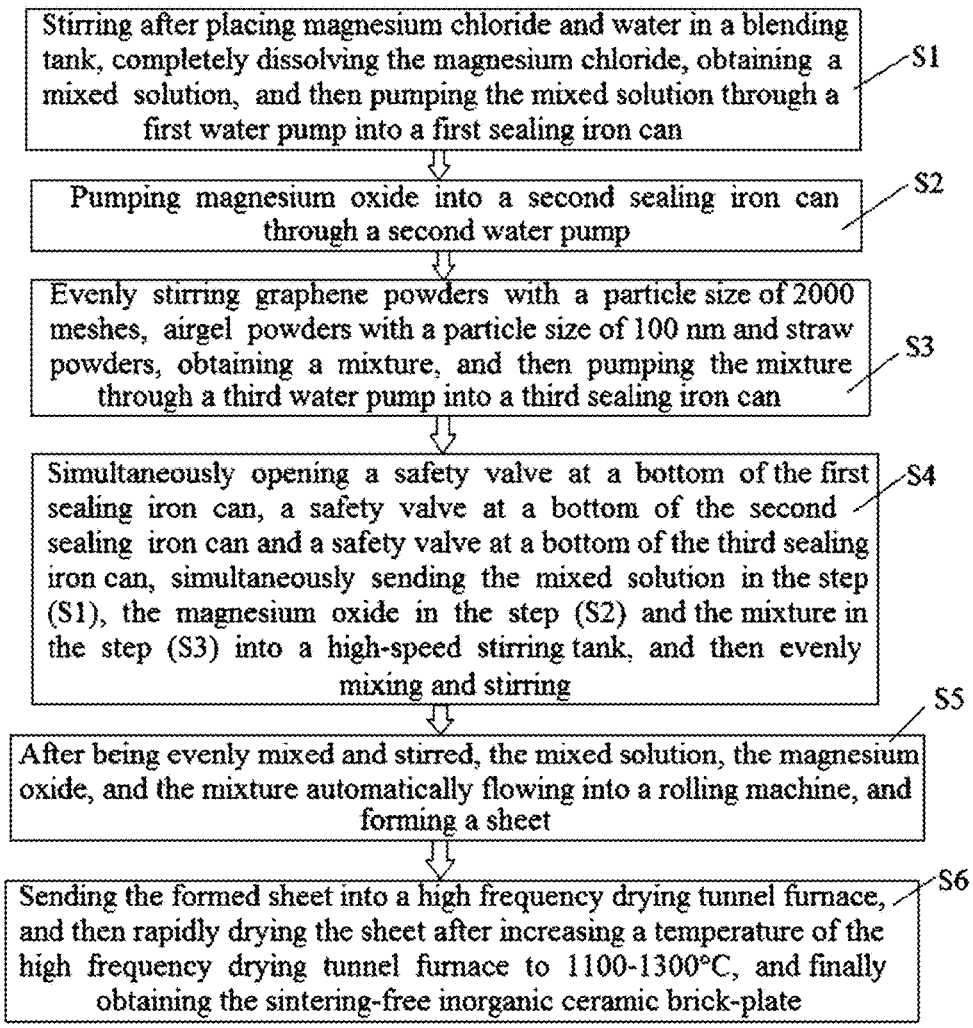
FIG. 1 is a flow chart of a preparation method of a sintering-free inorganic ceramic brick-plate provided by the present invention.
Figure 2:
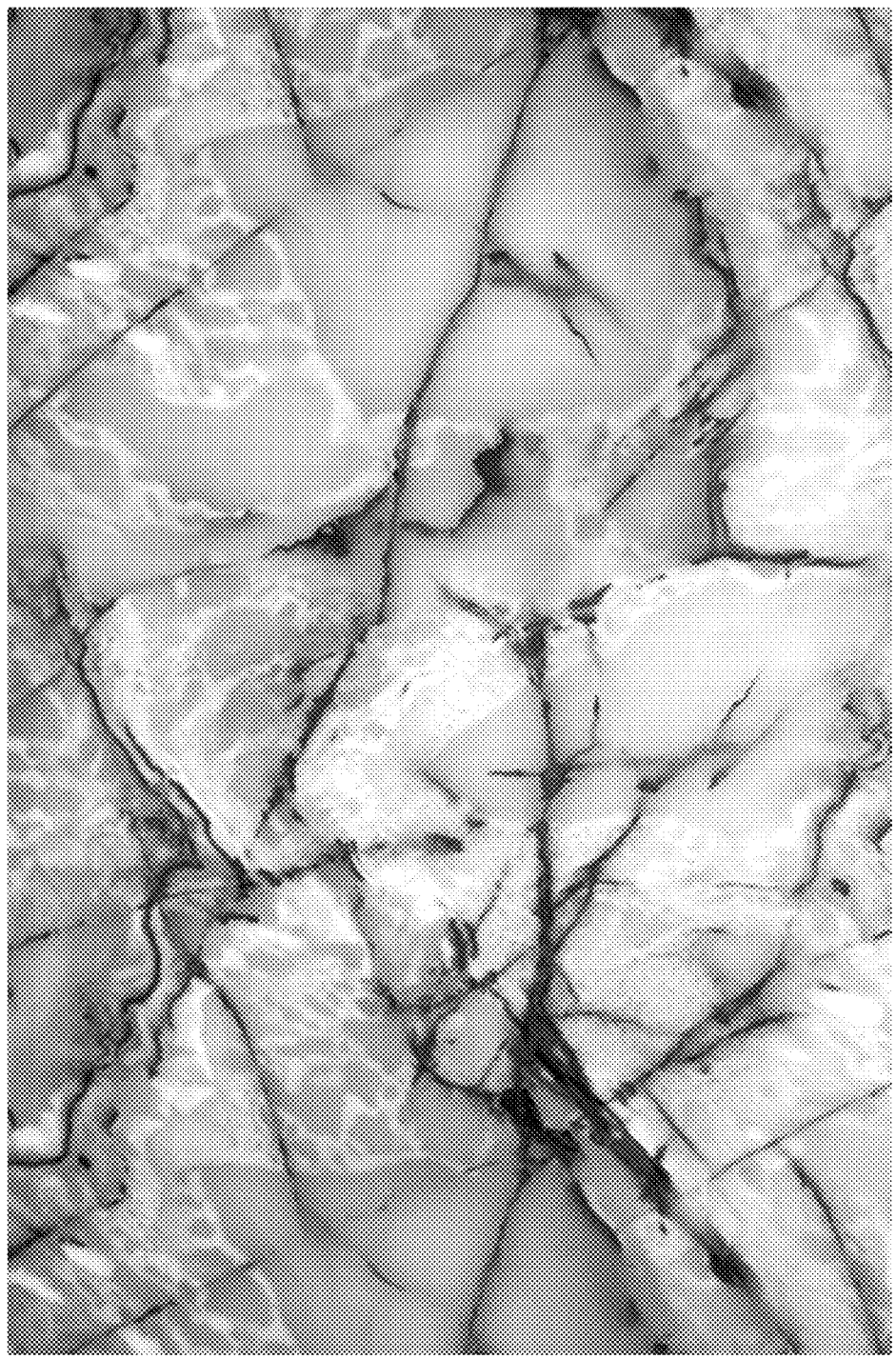
FIG. 2 is a first sample of a sintering-free inorganic ceramic brick-plate provided by the present invention.
Figure 3:
FIG. 3 is a second sample of a sintering-free inorganic ceramic brick-plate provided by the present invention.
Figure 4:
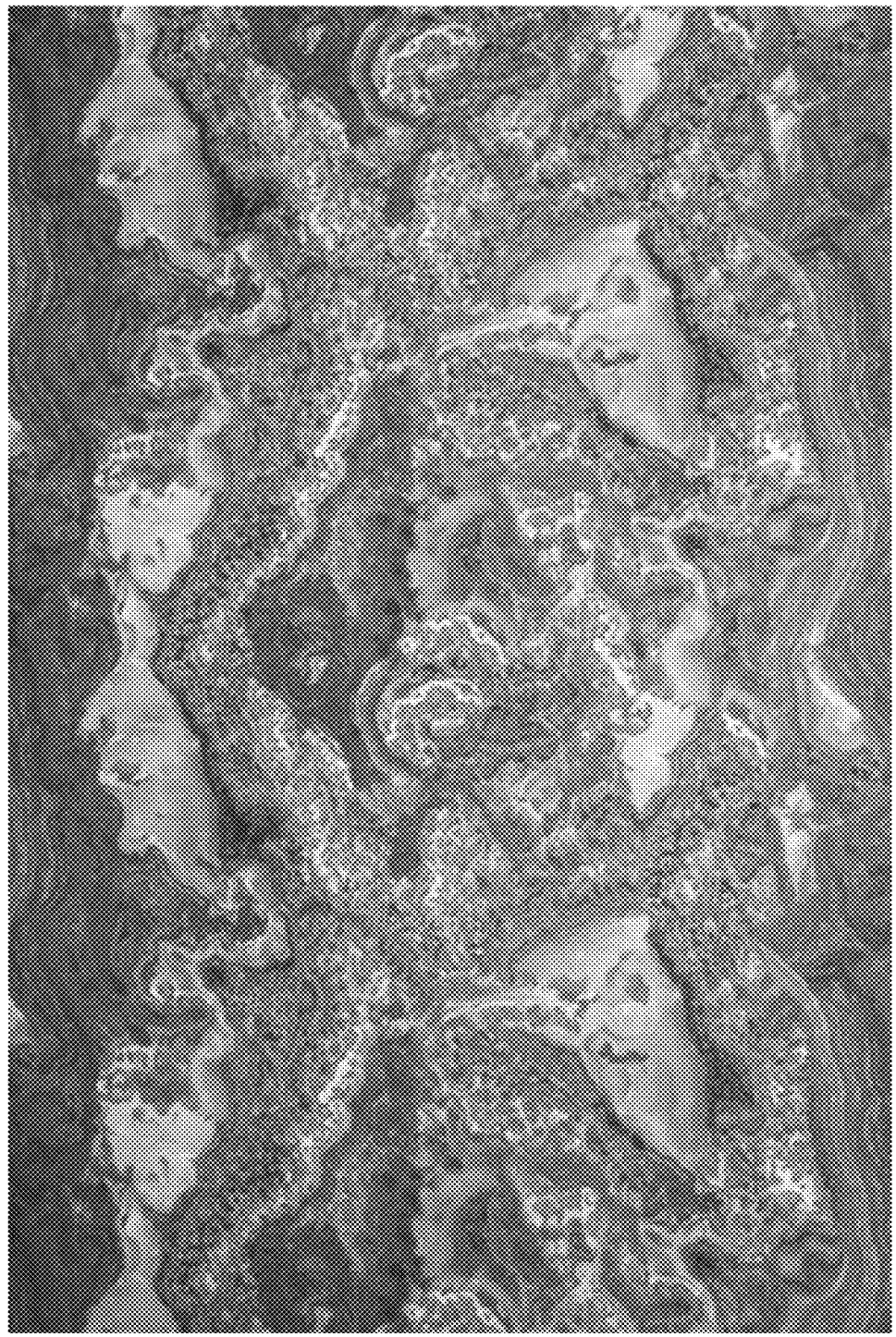
FIG. 4 is a third sample of a sintering-free inorganic ceramic brick-plate provided by the present invention.
Figure 5:
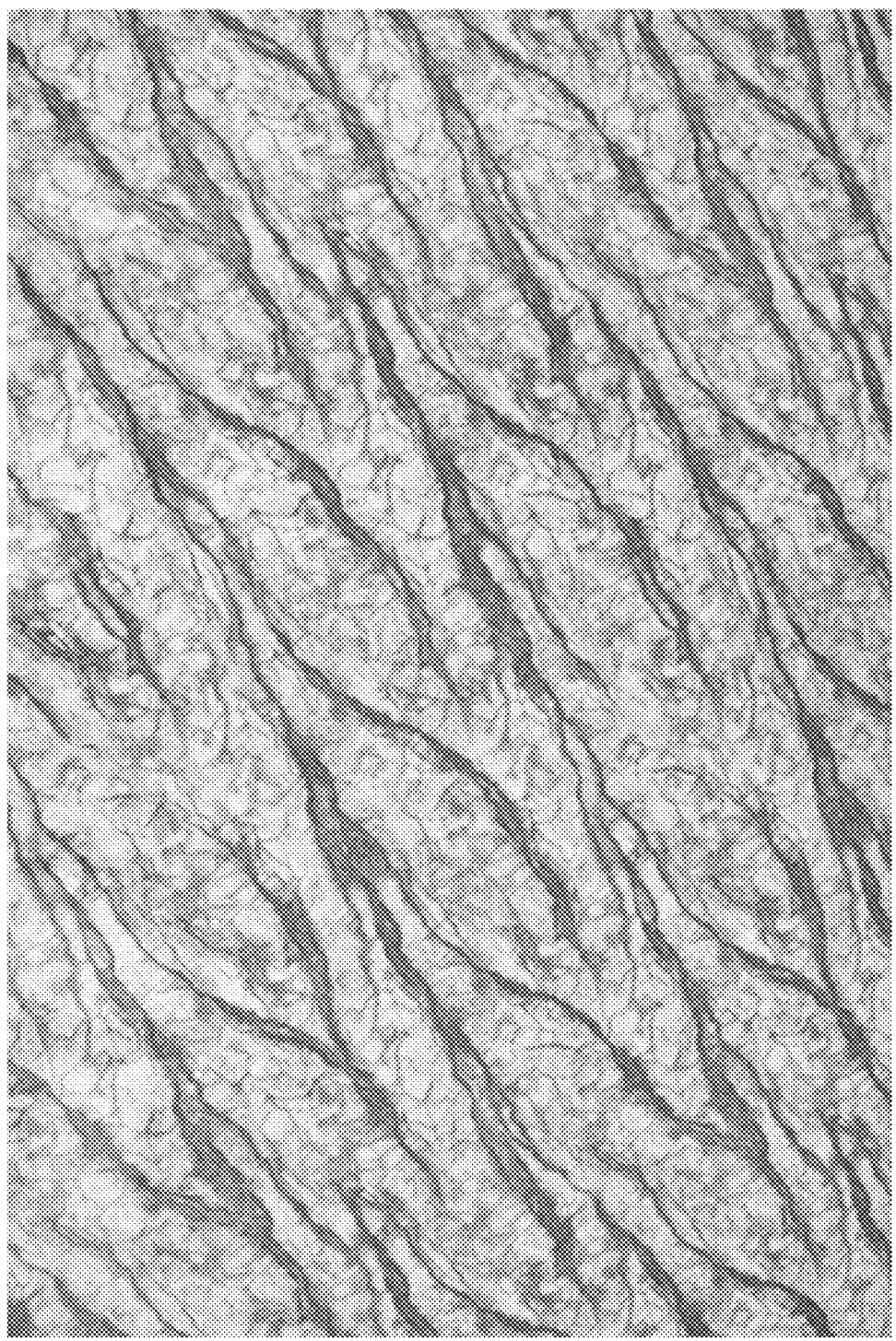
FIG. 5 is a fourth sample of a sintering-free inorganic ceramic brick-plate provided by the present invention.
Figure 6:
FIG. 6 is a fifth sample of a sintering-free inorganic ceramic brick-plate provided by the present invention.
Figure 7:
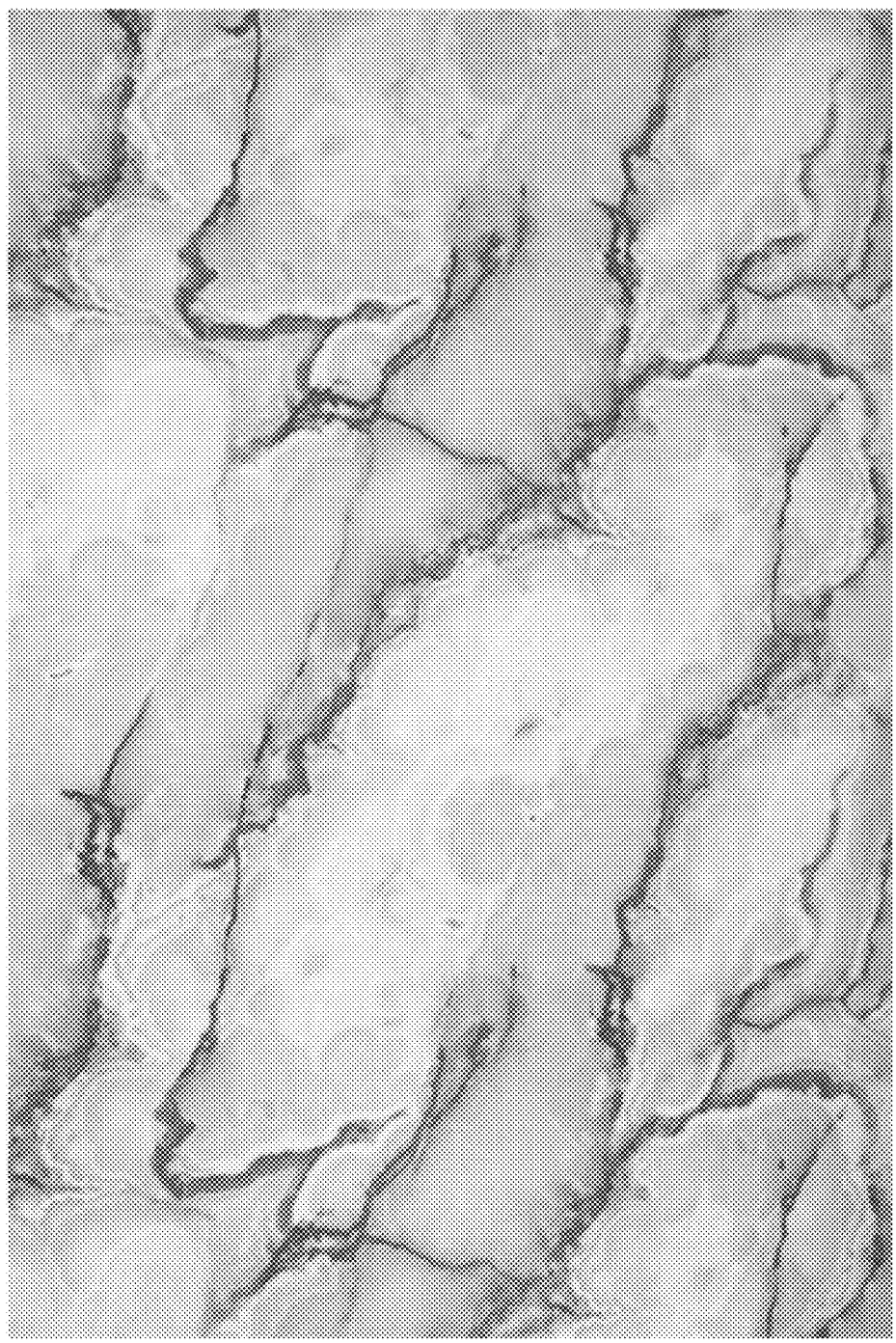
FIG. 7 is a sixth sample of a sintering-free inorganic ceramic brick-plate provided by the present invention.
Figure 8:
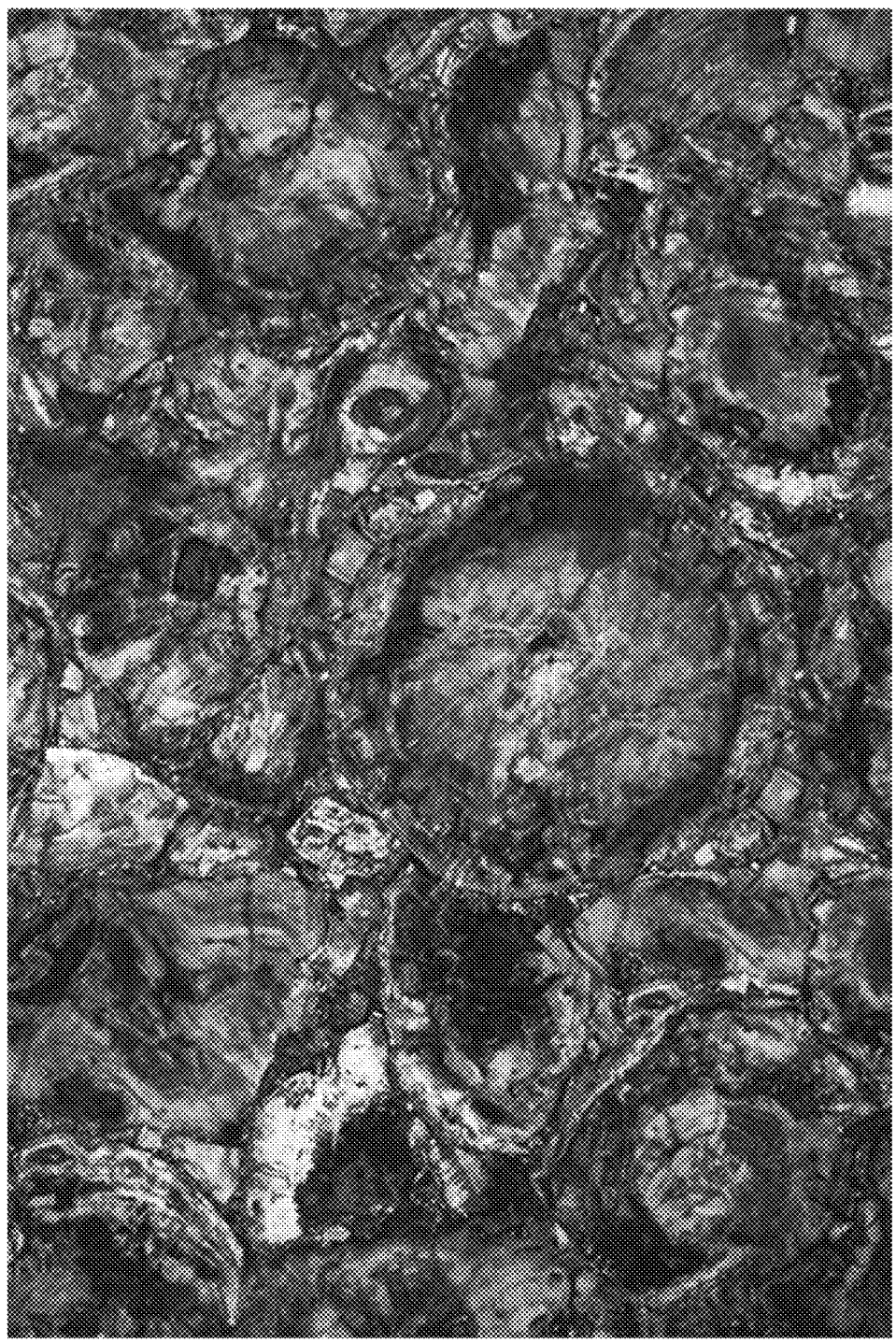
FIG. 8 is a seventh sample of a sintering-free inorganic ceramic brick-plate provided by the present invention.
Figure 9:
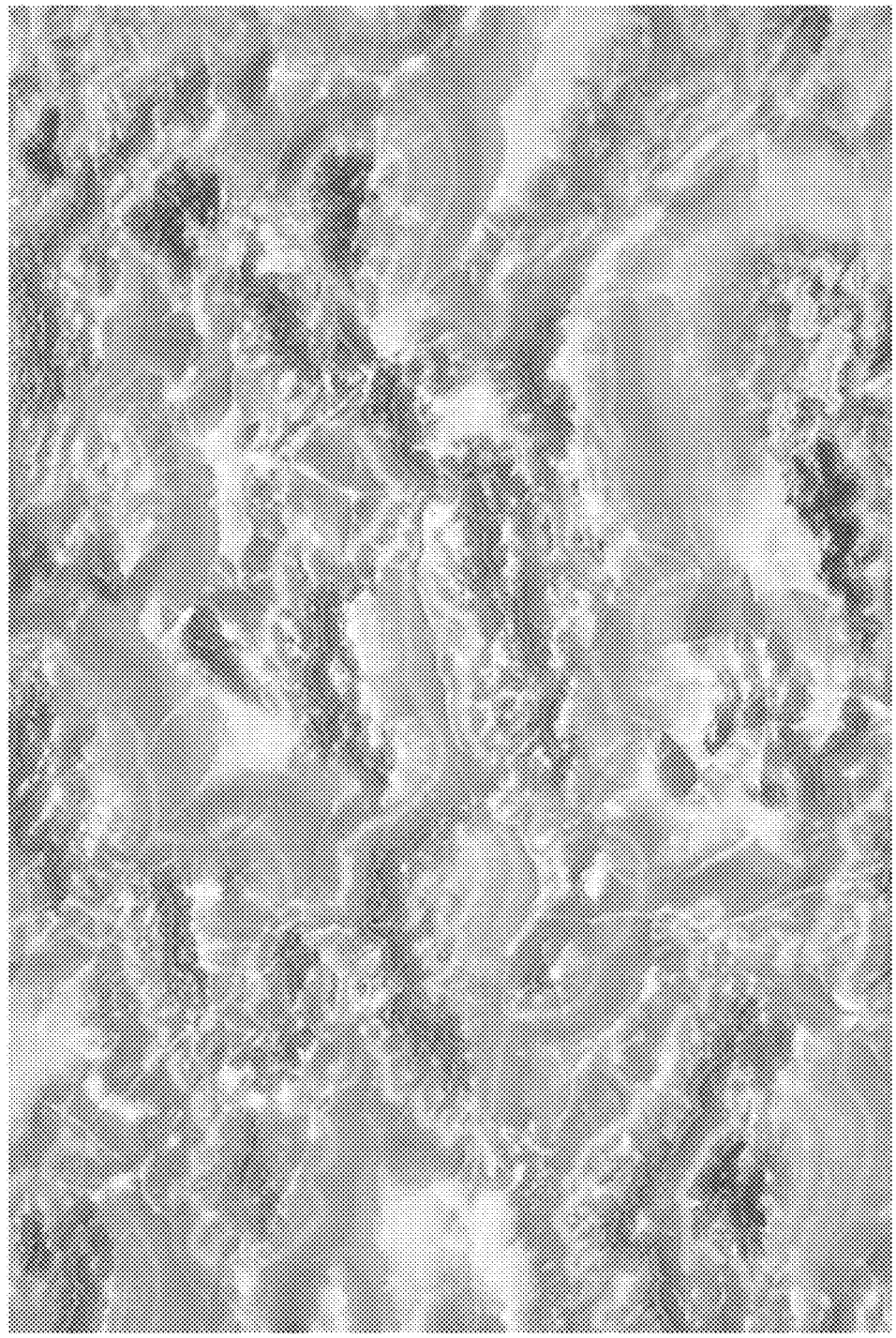
FIG. 9 is an eighth sample of a sintering-free inorganic ceramic brick-plate provided by the present invention.

Referring to FIG. 1, a preparation method of a sintering-free inorganic ceramic brick-plate, provided by the present invention, is illustrated, which comprises steps of:

(S1) stirring after placing magnesium chloride and water in a blending tank, completely dissolving the magnesium chloride, obtaining a mixed solution, and then pumping the mixed solution through a first water pump into a first sealing iron can;

(S2) pumping magnesium oxide into a second sealing iron can through a second water pump;

(S3) evenly stirring graphene powders with a particle size of 2000 meshes, airgel powders with a particle size of 100 nm and straw powders, obtaining a mixture, and then pumping the mixture through a third water pump into a third sealing iron can;

(S4) simultaneously opening a safety valve at a bottom of the first sealing iron can, a safety valve at a bottom of the second sealing iron can and a safety valve at a bottom of the third sealing iron can, simultaneously sending the mixed solution in the step (S1), the magnesium oxide in the step (S2) and the mixture in the step (S3) into a high-speed stirring tank, and then evenly mixing and stirring;

(S5) after being evenly mixed and stirred, the mixed solution, the magnesium oxide, and the mixture automatically flowing into a rolling machine, and forming a sheet; and (S6) sending the formed sheet into a high frequency drying tunnel furnace, and then rapidly drying the sheet after increasing a temperature of the high frequency drying tunnel furnace to 1100-1300° C., and finally obtaining the sintering-free inorganic ceramic brick-plate.

Compared with the prior art, the present invention makes full use of a variety of raw natural non-toxic natural mineral raw materials, namely, the graphene powders with the particle size of 2000 meshes and the airgel powders with the particle size of 100 nm for mixing, and then the mixed raw materials can be solidified at room temperature and form sheets, and then the surface of the sheets is processed through printing or spraying glaze, so as to achieve the effect of high-grade tiles and natural marble. The present invention also has the characteristics of heat insulation, light weight, high strength, good toughness and no fragility. All of the raw materials of the present invention are recyclable and reusable, which makes a great contribution to improving the environment, reducing heat emissions and sulfur emissions, and saving resources. The sintering-free inorganic ceramic brick-plate provided by the present invention has far-reaching significance and great value.

A first retractable bracket with non-alkali glass fiber cloth and a first automatic cutting machine with non-alkali glass fiber cloth are installed at an upper surface of the rolling machine, a second retractable bracket with non-alkali glass fiber cloth and a second automatic cutting machine with non-alkali glass fiber cloth are installed at a lower surface of the rolling machine; an upper surface of the formed sheet is coated with a first layer of non-alkali glass fiber cloth through the first retractable bracket cooperating with the first automatic cutting machine, a lower surface of the formed sheet is coated with a second layer of non-alkali glass fiber cloth through the second retractable bracket cooperating with the second automatic cutting machine.

The sintering-free inorganic ceramic brick-plate semi-finished product has no need for pressing and sintering and is formed by a stirring-type self-flow rolling machine. The rolling machine is able to automatically measure for adjusting a height of a roller, so as to obtain the sintering-free inorganic ceramic brick-plate with a thickness of 2 mm-30 mm, a length of 10 m and a width of 60 mm-2000 mm.

First Embodiment

A sintering-free inorganic ceramic brick-plate, provided by the present invention, comprises following components by mass parts of:

| | |
|---|---|
| magnesium oxide | 25 parts; |
| magnesium chloride | 20 parts; |

-continued

| | |
|---|---|
| fumed silica | 20 parts; |
| straw powders | 10 parts; |
| graphene powders with a particle size of 2000 meshes | 0.1 parts; and |
| airgel powders with a particle size of 100 nm | 0.2 parts. |

Second Embodiment

A sintering-free inorganic ceramic brick-plate, provided by the present invention, comprises following components by mass parts of:

| | |
|---|---|
| magnesium oxide | 40 parts; |
| magnesium chloride | 35 parts; |
| fumed silica | 30 parts; |
| straw powders | 20 parts; |
| graphene powders with a particle size of 2000 meshes | 0.3 parts; and |
| airgel powders with a particle size of 100 nm | 0.4 parts. |

Third Embodiment

A sintering-free inorganic ceramic brick-plate, provided by the present invention, comprises following components by mass parts of:

| | |
|---|---|
| magnesium oxide | 32 parts; |
| magnesium chloride | 28 parts; |
| fumed silica | 25 parts; |
| straw powders | 14.5 parts; |
| graphene powders with a particle size of 2000 meshes | 0.2 parts; and |
| airgel powders with a particle size of 100 nm | 0.3 parts. |

The sintering-free inorganic ceramic brick-plate is prepared by a method which specifically comprises steps of:

(S1) stirring for 40 min after placing magnesium chloride and room temperature water (above 25° C.) with a ratio of 1:50 in a blending tank, completely dissolving the magnesium chloride, obtaining a mixed solution, and pumping the mixed solution through a first water pump into a first sealing iron can, wherein the first sealing iron can is located at 10 m above ground;

(S2) pumping magnesium oxide into a second sealing iron can through a second water pump, wherein the second sealing iron can is located at 10 m above ground;

(S3) evenly stirring graphene powders, airgel powders and straw powders for 1 min, obtaining a mixture, and pumping the mixture into a third sealing iron can through a third water pump, wherein the third sealing iron can is located at 10 m above ground;

(S4) installing a safety valve at a bottom of all of the first, second and third sealing iron cans, opening the safety valve at the bottom of all of the first, second and third sealing iron cans while producing, the mixed solution in the step (S1), the magnesium oxide in the step (S2) and the mixture in the step (S3) automatically flowing into a high-speed stirring tank which is installed with an automatic measuring device and has a stirring speed of 3000 r/min above, and then the mixed solution, the magnesium oxide and the mixture automatically flowing into a self-flow rolling machine after being evenly mixed and stirred through the automatic measuring device, and forming a sheet;

(S5) installing a first retractable bracket with non-alkali glass fiber cloth and a first automatic cutting machine with non-alkali glass fiber cloth at an upper surface of the rolling machine, installing a second retractable bracket with non-alkali glass fiber cloth and a second automatic cutting machine with non-alkali glass fiber cloth at a lower surface of the rolling machine; coating a first layer of non-alkali glass fiber cloth on an upper surface of the formed sheet through the first retractable bracket cooperating with the first automatic cutting machine, coating a second layer of non-alkali glass fiber cloth on a lower surface of the formed sheet through the second retractable bracket cooperating with the second automatic cutting machine, such that a layer of alkali-free glass fiber cloth with a thickness of 0.3-0.6 mm is added at both the upper surface and the lower surface of the sheet for enhancing;

(S6) printing a variety of patterns after placing the sheet with the alkali-free glass fiber cloth in an automatic printing and spraying glaze machine according to product requirements, automatically sending the sheet with the printed patterns into a high frequency drying tunnel furnace, and then rapidly drying the sheet after increasing a temperature of the high frequency drying tunnel furnace to 1100-1300° C., and finally obtaining the sintering-free inorganic ceramic brick-plate; and (S7) according to special requirements of customers, directly printing ceramic paint or inorganic colorful weather-resistant paint on the sintering-free inorganic ceramic brick-plate through a printing machine or a roll coater.

After being printed, the sintering-free inorganic ceramic brick-plate is not much different from the high grade ceramic tile. FIGS. 2-9 respectively show the eight samples of the sintering-free inorganic ceramic brick-plate prepared by the sintering-free method provided by the present invention.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A sintering-free inorganic ceramic brick-plate, comprising following components by mass parts of:

| | |
|---|---|
| magnesium oxide | 25-40 parts; |
| magnesium chloride | 20-35 parts; |
| Fumed silica | 20-30 parts; |
| straw powders | 10-20 parts; |
| graphene powders with a particle size of 2000 meshes | 0.1-0.3 parts; and |
| airgel powders with a particle size of 100 nm | 0.2-0.4 parts. |

2. The sintering-free inorganic ceramic brick-plate, as recited in claim 1, wherein: the sintering-free inorganic ceramic brick-plate comprises following components by mass parts: 32 parts of the magnesium oxide, 28 parts of the magnesium chloride, 25 parts of the fumed silica, 14.5 parts of the straw powders, 0.2 parts of the graphene powders with the particle size of 2000 meshes, and 0.3 parts of the airgel powders with the particle size of 100 nm.

* * * * *